J. Riggsbee. Cotton Seed Planter.

105000  PATENTED JUL 5 1870

Witnesses:
John Becker
D. S. Mabee

Inventor:
J. Riggsbee
Per Munn & Co
Attorneys

United States Patent Office.

JORDAN RIGGSBEE, OF CHAPEL HILL, NORTH CAROLINA.

Letters Patent No. 105,000, dated July 5, 1870.

IMPROVEMENT IN COTTON-SEED PLANTER.

The Schedule referred to in these Letters Patent and making part of the same.

*To all whom it may concern:*

Be it known that I, JORDAN RIGGSBEE, of Chapel Hill, in the county of Orange and State of North Carolina, have invented a new and useful Improvement in Cotton-seed Planters; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish an improved cotton-seed planter, simple in construction and effective in operation; and It consists in the construction and combination of the various parts of the machine, as hereinafter more fully described.

A are the wheels, which are attached to and revolve upon the journals of the axles B, in the ordinary manner.

C are the thills, which are rigidly attached to the axle B, and which, in connection with the said axle, form the frame-work of the planter.

With one of the wheels A is rigidly connected a pulley, D, around which passes the band E, which band also passes around a pulley, F, attached to the end of the shaft G.

The band E and its pulleys D F may, if desired, be replaced by gear-wheels.

Figure 1:
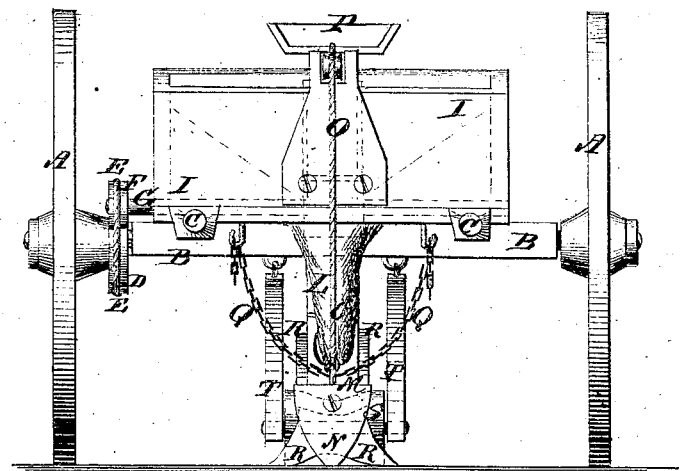
Figure 1 is a front view of my improved machine.
Figure 2:
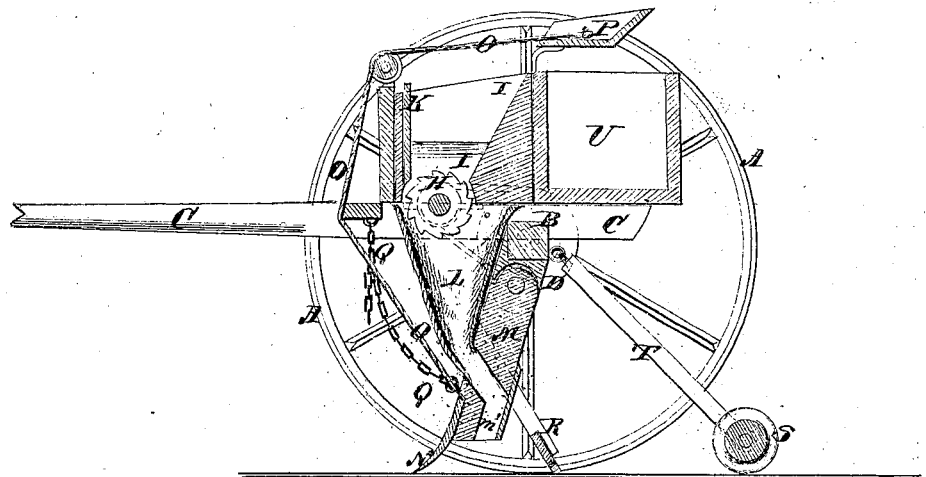
Figure 2 is a vertical longitudinal section of the same, taken through the line $x\,x$, fig. 1.

The shaft G revolves in bearings attached to the thills C, and upon its middle part is formed, or to it is attached, a cylinder, H, the face of which is corrugated, as shown in fig. 2, said corrugations being so made as to give the cylinders in their cross-sections the appearance of a ratchet-wheel.

The upper side of a cylinder, H, projects through an opening in the bottom of the seed-hopper I, so as to take hold of the seed, and carry or draw it out of the said hopper.

The hopper I is attached to the thills C just in front of the axle B, and is made with a hopper-shaped bottom, to guide the seed down to the cylinder H.

The size of the discharge-opening through which the seed passes out of the hopper I is regulated by a sliding plate, K, which slides in grooves formed in or attached to the said hopper I.

From the hopper I the seed passes into the conductor-spout L, through an opening or channel, $m'$, in the lower part of the plow-standard M, and drops to the ground in the rear of the plow N, attached to the lower end of said standard M.

The upper end of the standard M is hinged or jointed to the axle B, or to a support attached to said axle, so that the lower end of the plow-standard M may be raised for convenience in passing obstructions, or when passing from place to place. To enable this to be done, the conductor-spout L must be made of cloth, leather, rubber, or other suitable flexible material.

The lower end of the standard M is raised, when required, by the cord O, the lower end of which is attached to the lower part of the standard M.

The cord O passes over a pulley pivoted to the upper edge of the hopper I, or to a support attached to said hopper, and its upper end should be secured in such a position as to be conveniently reached and operated by the driver from his seat P.

The draft strain upon the plow-standard M is sustained by the chains Q, the lower ends of which are attached to the lower part of said standard, and the upper parts of which are attached to the thills C, or to the cross-bars of said thills, by being hooked upon hooks, so that the said chains may be conveniently lengthened and shortened, to regulate the depth at which the seed is planted in the ground.

R is the coverer, the lower edge of which is concaved, to give the desired form to the row or ridge, and which is rigidly attached to the standard M.

The row or ridge may be still further pressed down and formed by the roller S, the face of which is concaved, and which is pivoted to and between the rear ends of the bars or arms T, the forward ends of which have eyes formed in or attached to them, to hook upon hooks attached to the axle B, so that the roller may be conveniently detached when not required for use.

V is a box or seed-reservoir, which rests upon and is attached to the rearwardly-projecting ends of the thills C, as shown in fig. 2.

The box V is designed to contain a supply of cotton-seed, so that the hopper I may be supplied with seed as required, even without stopping the machine.

It is also designed that the driver should be supplied with a fork or other instrument, with which he may keep the cotton-seed pressed down to the dropping-wheel, to keep the seed from clogging and insure its being fed out uniformly.

Having thus described my invention,

I claim as new and desire to secure by Letters Patent—

1. An improved cotton-seed planter, formed by the combination of the wheel A, axle B, thills C, band and pulleys D E F, or equivalent gearing, shaft G, dropping-cylinder H, hopper I, adjustable slide K, flexible conductor-spout L, hinged or jointed plow-standard M $m'$, plow N, draft-chains Q, adjustingcord O, and coverer R, with each other, said parts being constructed and arranged substantially as herein shown and described, and for the purpose set forth.

2. The combination of the seed-box or reservoir V wish the thills C, hopper I, and seed-dropping device, substantially as herein shown and described, and for the purpose set forth.

3. The combination of the detachable rollers S T with the axle B, coverer R, opening-plow N, hinged or jointed plow-standard M, and seed-dropping device, substantially as herein shown and described, and for the purpose set forth.

JORDAN RIGGSBEE.

Witnesses:
F. F. NORWOOD,
J. F. FREELAND.